US 6,599,211 B2

United States Patent
Sattler

(10) Patent No.: US 6,599,211 B2
(45) Date of Patent: Jul. 29, 2003

(54) V-BELT FOR LOW-LOSS POWER TRANSFER

(75) Inventor: Heiko Sattler, Hannover (DE)

(73) Assignee: Contitech Antriebssysteme GmbH, Hannover (DE)

( * ) Notice: Subject to any disclaimer, the term of this patent is extended or adjusted under 35 U.S.C. 154(b) by 0 days.

(21) Appl. No.: 09/871,678

(22) Filed: Jun. 4, 2001

(65) Prior Publication Data

US 2001/0053726 A1 Dec. 20, 2001

(30) Foreign Application Priority Data

Jun. 2, 2000 (DE) .......................... 100 26 877

(51) Int. Cl.[7] ............... F16G 5/16; F16G 1/21
(52) U.S. Cl. .............. 474/242; 474/201; 474/244
(58) Field of Search ................ 474/201, 242, 474/245, 244, 238, 240, 237, 243

(56) References Cited

U.S. PATENT DOCUMENTS

| | | | | |
|---|---|---|---|---|
| 4,303,403 A | * | 12/1981 | Lamers | ................. 474/201 |
| 4,734,085 A | | 3/1988 | Takashima et al. | |
| 5,776,023 A | | 7/1998 | Okawa et al. | |

FOREIGN PATENT DOCUMENTS

| | | | | |
|---|---|---|---|---|
| EP | 073962 A1 | * | 3/1983 | ............. 474/242 |
| EP | 0 135 710 | | 9/1987 | |
| JP | 0009345 A | * | 1/1982 | ............. 474/201 |
| JP | 62-151646 A | * | 7/1987 | |

* cited by examiner

Primary Examiner—Marcus Charles
(74) Attorney, Agent, or Firm—Walter Ottesen

(57) ABSTRACT

A V-belt transmits rotational movements between at least two belt pulleys and includes at least one endless load carrier and a plurality of transverse blocks mounted thereon. The load carrier is fitted into slots which extend from at least one inclined lateral surface of a block toward the center region thereof. The load carrier has a contact surface which faces a boundary surface of the slot in the block. The contact surface and the boundary surface are provided with convex and/or concave sections. To minimize losses and increase efficiency, the pressing force is reduced where the slide movement occurs. A contact region is assumed between the stretched state of the V-belt up to the state corresponding to the smallest running radius. In the entire contact region, a continuously changeable curvature or a composite of at least three sections of constant curvature is realized in such a manner that the curvature from the center of the contact region to the outer region increases.

2 Claims, 5 Drawing Sheets

V-BELT FOR LOW-LOSS POWER TRANSFER

BACKGROUND OF THE INVENTION

A continuous rpm and torque conversion requires high transfer efficiencies especially in automotive applications.

Belt arrangements known to date for transmitting rotational movements between at least two belt pulleys comprise two endless load carriers and a plurality of blocks mounted thereon. In this connection, reference can be made to, for example, European patent publication 0,135,710 and U.S. Pat. Nos. 4,734,085 and 5,776,023. In the known belt arrangements, the load carriers are fitted into slots which run from inclined side surfaces of the blocks toward the center regions thereof. The load carriers as well as the slots for accommodating the same have convex or concave sections whereby a relatively immovable interlocking engagement results in the longitudinal direction of the load carriers. The convex or concave sections are arranged on the load carriers and the blocks transversely to the running direction. With the aid of these sections, a synchronism between the forward movement of the load carriers and the blocks is obtained.

Different running radii occur at the drive end and output end in friction-tight operating V-belt drives and these different radii are caused by the system. In this way, curvature changes and stress changes occur in the body of the belt during operation. Different contact conditions occur at the contact location between the support blocks and the load carrier depending upon the running radius. These contact conditions have not been optimized in a targeted manner up to now in belt configurations for transmitting high powers with a continuously adjustable rpm ratio between drive shaft and output shaft. These belts are made of load carriers having elastomer cords and possibly fabric as well as a plurality of support blocks made of one material or a combination of materials with a higher modulus of elasticity than the elastomer used.

The different contact conditions occur because the load carrier, which consists in large parts of elastomer, is practically incompressible and is, because of the support blocks in the direction transverse to the belt, hindered to deflect in this direction. The direction transverse to the belt is in the direction of the transmission shaft axes. Depending upon the adjusted running radius, the arcuate length changes as the length, which is available for the elastomer beneath the cords, and, with reducing radius, more expansion space must be provided in the radial direction for the incompressible elastomer to an increasing extent. The configuration of a radius on the support block and a radius on the load carrier is known. The radius, which is configured on the support block is greater or equal to the radius on the load carrier as disclosed in U.S. Pat. No. 4,734,085. The opposite case is shown in U.S. Pat. No. 5,776,023.

SUMMARY OF THE INVENTION

It is an object of the invention to optimize the contact conditions between the load carrier and the blocks. The application of pressure is reduced where sliding movements occur in order to minimize losses and to increase efficiency.

The V-belt of the invention is wound around at least two pulleys each defining a groove and includes: at least one load carrier defining a longitudinal axis and being movable in the direction of the axis; a plurality of blocks having respective slots in which the load carrier is fitted; the load carrier being made of an elastomer and a plurality of tension cords; each of the blocks being disposed transversely to the longitudinal axis and having inclined surfaces adapted to the groove; each of the slots extending from one of the inclined surfaces of the block corresponding thereto toward the center region thereof; each of the blocks and the load carrier being interlocked so as to be immovable relative to each other in the direction of the longitudinal axis while, at the same time, being releasable from each other in a direction transverse to the longitudinal axis; each of the slots having mutually adjacent boundary surfaces between which the load carrier is fitted; the load carrier having respective contact surfaces facing toward corresponding ones of the boundary surfaces; the load carrier having convex and/or concave sections on at least one of the contact surfaces and the slot of each block having convex and/or concave sections on at least one of the boundary surfaces; the sections of the boundary surfaces coming into interlocking engagement with the concave or convex sections of the at least one contact surface; the contact surface and the boundary surface conjointly defining a contact region which is assumed from the stretched state of the V-belt to the state thereof wherein the smallest running radius occurs; and, over the complete extent of the contact region, a continuously changeable curvature or a composite of at least three sections of constant curvature is being realized on one of the contact partners in such a manner that the curvature from the center of the contact region to the outer regions thereof increases.

The force transmission between the load carrier and the support block is improved in that, on at least one contact partner, a continuously changing curvature or a composite of at least three sections of constant curvature are realized in such a manner that the curvature increases from the center of the contact region toward the outer regions. The contact region is from the stretched condition of the belt to the condition of smallest running radius.

The contact between the load carrier and the support block includes, in part, a form-tight configuration and, in part, a force-tight configuration. When the running radius becomes less, the above-described displacement action on the incompressible load carrier increases so that the form-tight connection is increased in the outer region with increasing curvature with surface normal peripheral forces. On the other hand, with the displacement effect, an increase of the surface pressure concentrates in the region of the larger radius at the center of the contact region so that, at this location, larger surface tangential thrust forces operate primarily in the peripheral direction with the friction value present between the load carrier and the support block; whereas, the pressing and the radially directed friction forces in the side regions are reduced in favor of the form-tight connection.

Up to now, the largest relative movements between the surfaces have occurred in the outer region in the change from stretched segment to curved segment between the discs. For this reason, the efficiency of the force transfer is improved via a reduction of the friction forces in the regions of greater movement and especially for the transfer ratios with small running radii.

Preferably, at least one load carrier is surrounded by a cover fabric at least one of the contact surfaces to the slot flanks (boundary surfaces of the slot). Such a cover fabric protects generally the base body of the belt against wear in the presence of relative movements and especially in the peripheral regions of the contact zone between load carrier and support block where the problem of slide movements is the greatest.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
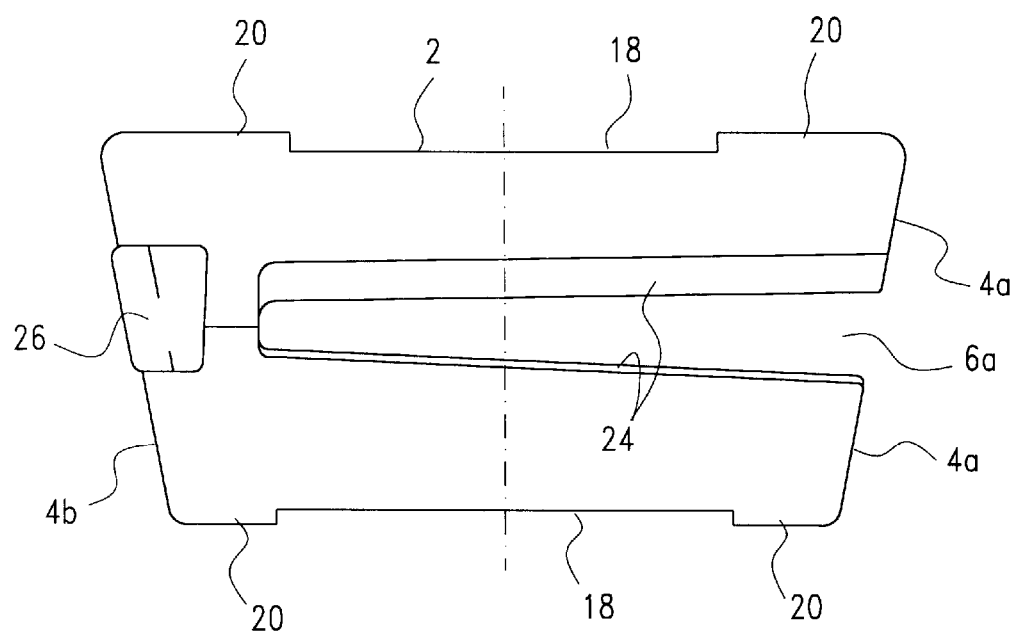
FIG. 1 is a front elevation view of a support block viewed in the longitudinal direction of a belt.

FIG. 1 shows a preferred embodiment of a support block 2 according to a feature of the invention. The support block 2 has an approximately trapezoidal cross section. Two mutually opposite lying side surfaces (4a, 4b) are inclined toward each other so that they correspond to the flanks of a belt pulley (not shown)

In one of these surfaces (4a, 4b), namely side surface 4a, a slot 6a is provided (boundary surfaces of the slot 24). This slot 6a runs, conically tapered, from the one side surface 4a in the direction toward the opposite-lying side surface 4b. Cutouts 18 (rises 20) are provided on the support block 2 for manipulating the V-belt arrangement and for saving weight.

Figure 2:
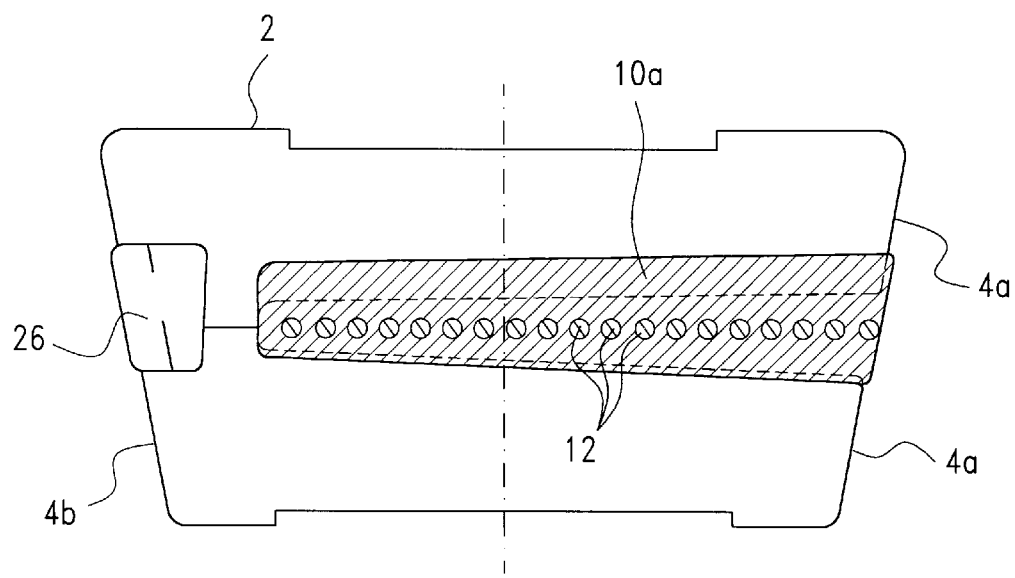
FIG. 2 shows the support block of FIG. 1 with a load carrier placed therein and with the load carrier shown in section.

As shown in FIG. 2, the V-belt arrangement of the invention comprises at least one load carrier 10a and a support block 2 mounted thereon. While the load carrier 10a essentially comprises an elastomeric body, tension cords 12 and possibly a cover fabric, the support block 2 is made of a material having a higher resistance to deformation than the load carrier and is preferably made of aluminum.

As also shown in FIG. 2, the slotted side surface 4a lying opposite the side surface 4b is provided with a friction coating 26. The load carrier 10a is introduced into the slot 6a and projects somewhat beyond the opening of the slot 6a. Continuous tension cords 12 or helically wound tension cords 12 are embedded in the load carrier 10a made of elastomer. The tension cords 12 are made of metal, glass fiber, polyester, aramide or drilled individual cords of the same material.

Figure 3:
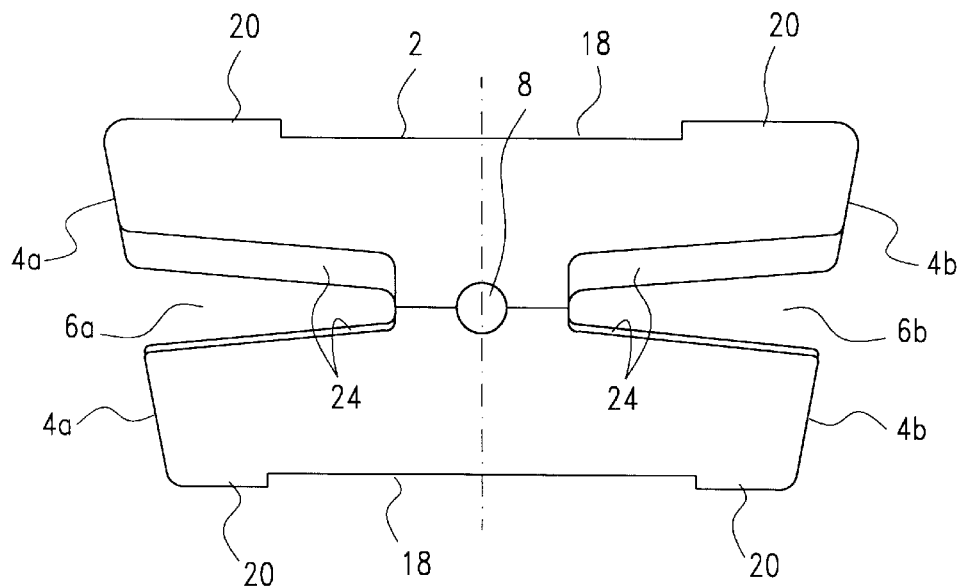
FIG. 3 is a front elevation view of an alternate embodiment of a support block viewed in the longitudinal direction of a belt.

FIG. 3 shows an alternate embodiment of a support block 2 according to a feature of the invention. The support block likewise includes an approximately trapezoidal cross section. Here too, two mutually adjacent side surfaces (4a, 4b) are inclined toward each other and these surfaces correspond to the flanks of a belt pulley (not shown).

Slots (6a, 6b) are provided in the mutually adjacent side surfaces (4a, 4b), respectively. These two slots (6a, 6b) are conically tapered and run from the side surfaces (4a, 4b), respectively, in the direction toward the center region of the block 2. Flanks (boundary surfaces) of the slot are identified by reference numeral 24.

Figure 4:
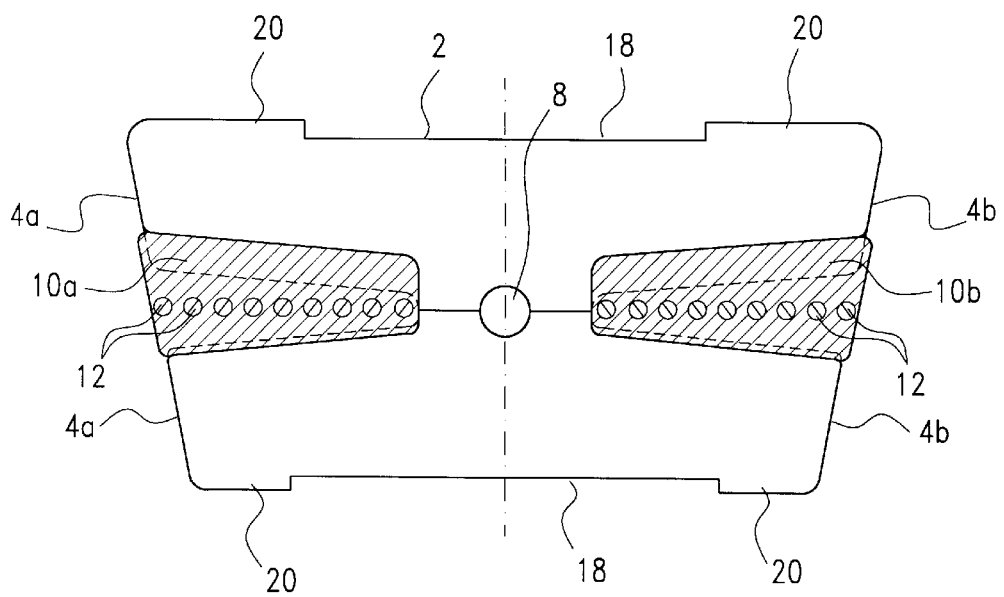
FIG. 4 is a support block corresponding to FIG. 3 shown with two load carriers, shown in section, placed therein.

FIG. 4 shows support block 2 with load carriers (10a, 10b) placed in the lateral slots (6a, 6b), respectively.

Figure 5:
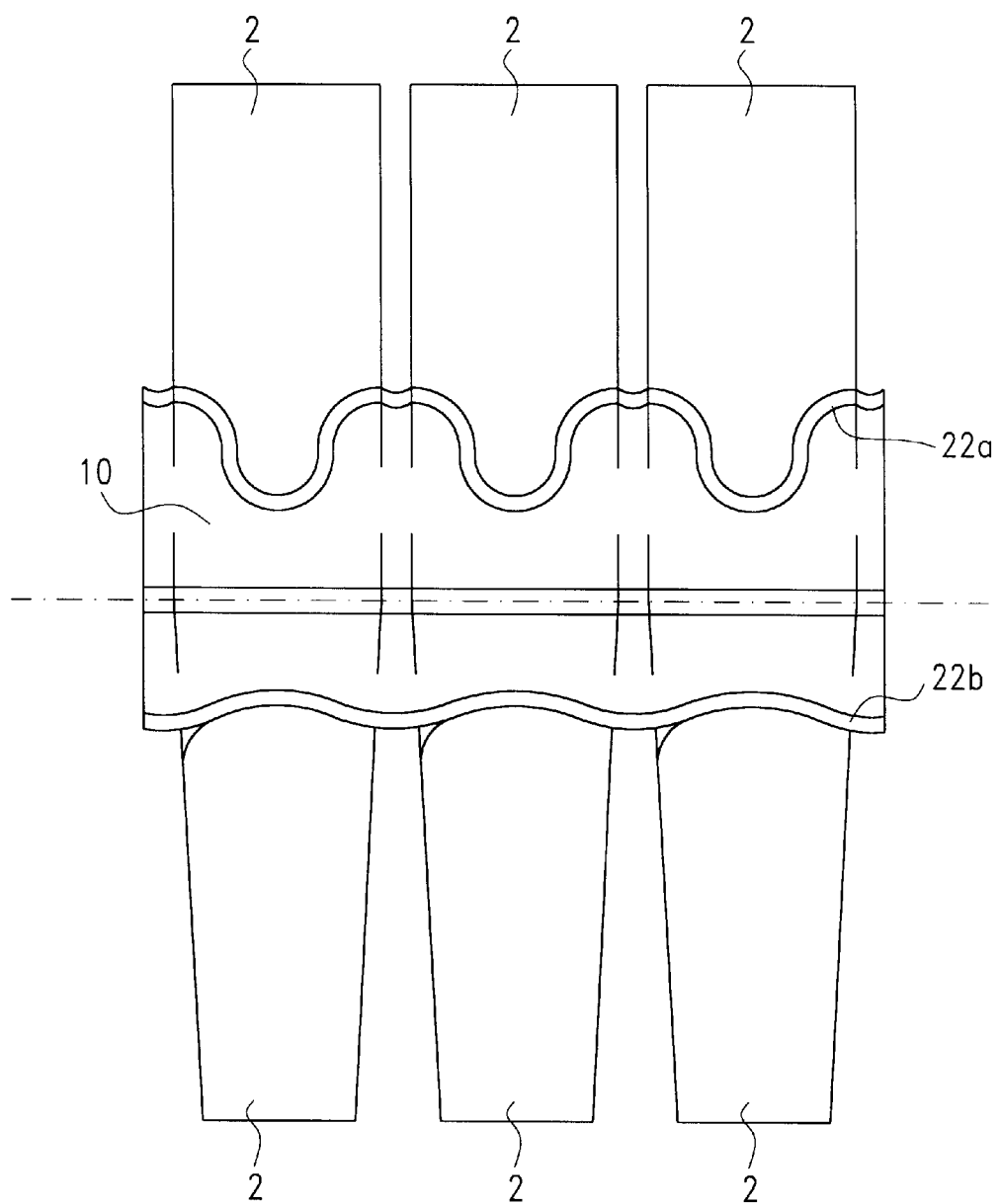
FIG. 5 is a side elevation view showing three support blocks with a corresponding segment of a load carrier inserted therein with the load carrier being in the stretched state.
Figure 6:
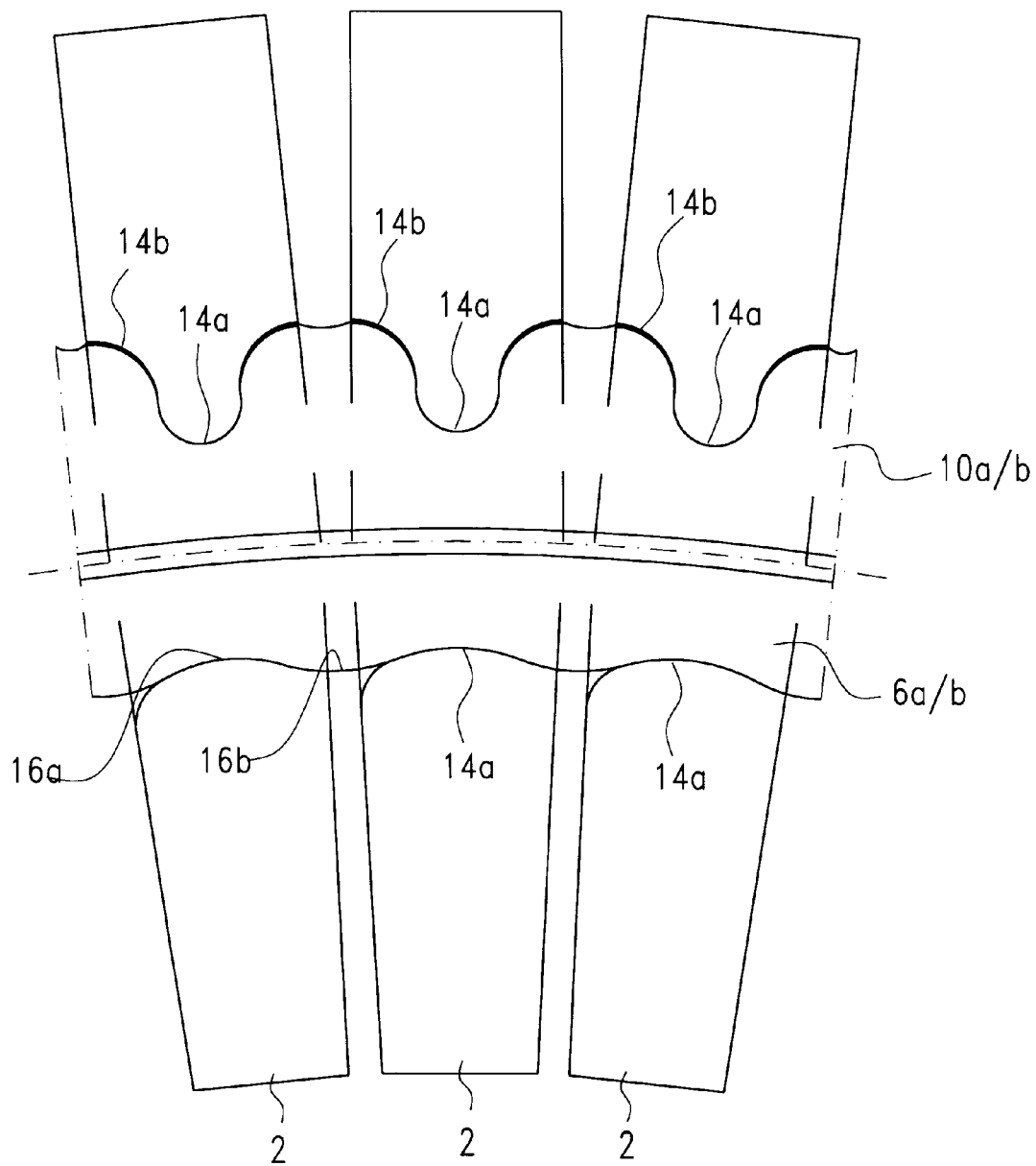
FIG. 6 shows the support blocks of FIG. 5 in the curved state.

FIGS. 5 and 6 show respective side elevation views. Here, it can be seen that the slots (6a, 6b) of the support blocks 2 as well as the load carriers (10a, 10b) disposed therein have concave and convex segments (14a, 14b; 16a, 16b). A convex segment 14a of slot 6a is shown in contact engagement with a concave segment 16a of the load carrier 10a and a convex section 14a of a slot 6b is in contact engagement with a concave segment 16a of the load carrier 10b. Conversely, a concave segment 14b of slot 6a is in contact engagement with a convex segment 16b of load carrier 10a and a section 14b of slot 6b with a convex section 16b of the load carrier 10b.

The embodiment shown here has convex segments 14a in the essential region of the block center on the upper and lower boundary surfaces 24 of the slot 6a and/or 6b. Other possible embodiments (not shown) have two concave boundary surfaces of the slot in the block center or above, a convex surface combined with a concave boundary surface below, or a concave surface above combined with a convex boundary surface of the block slot below with respective counterforms on the load carrier.

The load carrier 10 is additionally surrounded by a cover fabric (22a, 22b) in the embodiment shown in FIG. 5.

Figure 7C:
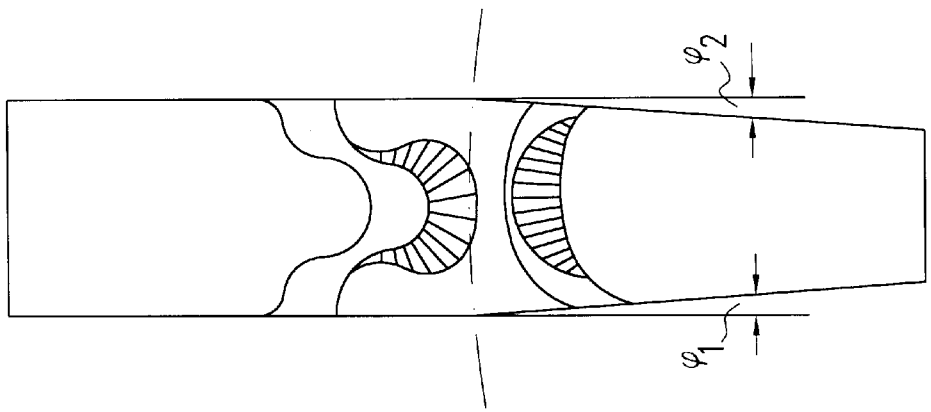
FIGS. 7a to 7c show enlarged detail views for explaining the radii.

FIG. 6 further shows that the blocks 2 are so configured that the inner ends of mutually adjacent blocks 2 do not come into mutual contact or hinder each other even for the smallest possible running radius because of bevels at the forward end $\phi_1$ and the rearward end $\phi_2$ (see FIG. 7c).

Figure 7B:
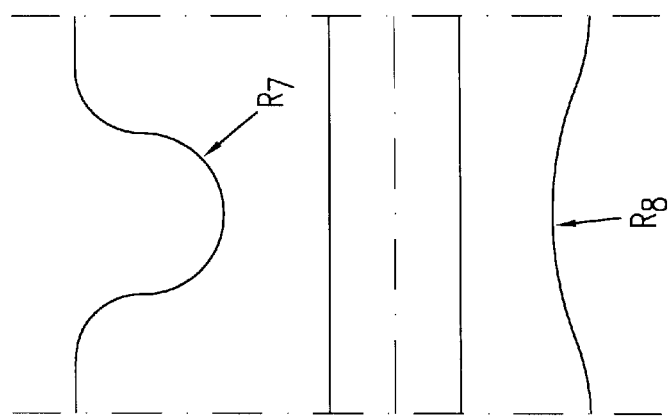
Figure 7A:
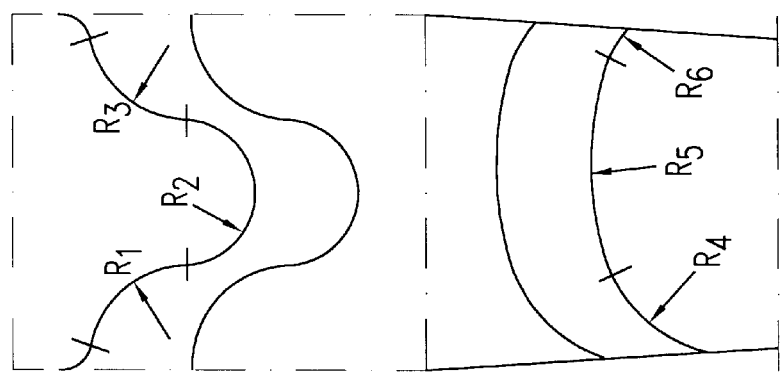

The enlarged side elevation detail views in FIGS. 7a and 7b show that the boundary contours of the upper and lower slot surfaces comprise at least three segments in the support block. These segments are shown separated from each other by lines. In each of the three segments, different curvatures are present in accordance with the radii having the corresponding dimension arrows ($R_1$ to $R_6$).

In connection with the load carrier shown in FIG. 7b and its simple curvatures having the radii $R_7$ and $R_8$ in the region of the block center on the outer and inner toothing, the pressing force at the contact surfaces is so adjusted because of the lower slot surface of the block having the three radii that a pressing or squeezing concentration occurs in the region of the block center where slight slide movements occur and, that at the side regions where there are large slide movements, the pressing concentration reduces rapidly. The contour of the upper slot surface of the block likewise comprises at least three radii of which two are configured negative in the embodiment shown and, in combination with the radius $R_7$, a pressing distribution results at the region of the block center which increases the efficiency because of the concentration of the pressing in the contact region where the slide movement is low.

FIG. 7c shows the pressing concentration in the center low movement regions and the pressing force reduction in the side regions of the slot surface.

It is understood that the foregoing description is that of the preferred embodiments of the invention and that various changes and modifications may be made thereto without departing from the spirit and scope of the invention as defined in the appended claims.

What is claimed is:

1. A V-belt wound around at least two pulleys each defining a groove and said V-belt having a stretched state between said pulleys and a smallest running radius when moving around, said pulleys, the V-belt comprising:

at least one load carrier defining a longitudinal axis and being movable in the direction of said axis;

a plurality of blocks having respective slots in which said load carrier is fitted;

said load carrier being made of an elastomer and a plurality of tension cords;

each of said blocks having a center region and being disposed transversely to said longitudinal axis and having inclined surfaces adapted to said groove;

each of said slots extending from one of said inclined surfaces of the block corresponding thereto toward the center region thereof;

each of said blocks and said load carrier being interlocked so as to be immovable relative to each other in the direction of said longitudinal and being releasable from each other in a direction transverse to said longitudinal axis;

each of said slots having mutually adjacent boundary surfaces between which said load carrier is fitted;

said load carrier having respective contact surfaces facing toward corresponding ones of said boundary surfaces;

said load carrier having at least one of convex and concave sections on at least one of said contact surfaces and the slot of each block having at least one of convex and concave sections on at least one of said boundary surfaces;

said sections of the boundary surfaces coming into interlocking engagement with the concave or convex sections of said at least one contact surface;

said contact surface and said boundary surface conjointly defining a contact region which is assumed from the stretched state of said V-belt to a state of said V-belt wherein the smallest running radius occurs; and, over the complete extent of said contact region, a continuously changeable curvature or a composite of at least three sections of constant curvature being realized on one of said block and said load carrier so as to cause the curvature from the center of said contact region to outer portions of said contact region to increase.

2. The V-belt of claim 1, wherein said load carrier has a covering fabric enclosing at least one of said contact surfaces.

* * * * *

UNITED STATES PATENT AND TRADEMARK OFFICE
CERTIFICATE OF CORRECTION

PATENT NO. : 6,599,211 B2 Page 1 of 1
DATED : July 29, 2003
INVENTOR(S) : Heiko Sattler It is certified that error appears in the above-identified patent and that said Letters Patent is hereby corrected as shown below:

Title page,
Item [73], Assignee, delete "Contitech" and substitute -- ContiTech -- therefor.

Column 2,
Line 57, delete "at least" and substitute -- at at least -- therefor.

Column 3,
Line 28, delete "shown)" and substitute -- shown). -- therefor.

Column 4,
Line 63, delete "around," and substitute -- around -- therefor.

Column 5,
Line 10, insert -- "axis" -- after "longitudinal".

Signed and Sealed this

Twentieth Day of January, 2004

JON W. DUDAS
*Acting Director of the United States Patent and Trademark Office*